United States Patent [19]

MacTaggart

[11] Patent Number: 5,446,784
[45] Date of Patent: Aug. 29, 1995

[54] APPARATUS FOR COUPLING A TELEPHONE LINE TO A TELEPHONE LINE SUBSCRIBER DEVICE

[76] Inventor: Donald MacTaggart, 4144 Marlowe Ave., Montreal, Quebec, Canada, H4A 3M2

[21] Appl. No.: 151,412

[22] Filed: Nov. 12, 1993

Related U.S. Application Data

[63] Continuation-in-part of Ser. No. 22,965, Feb. 25, 1993, abandoned.

[51] Int. Cl.$^6$ .................... H04M 11/00; H04M 3/42
[52] U.S. Cl. .................... 379/102; 379/180; 379/201; 379/373
[58] Field of Search ............ 379/201, 93, 181, 183, 379/179, 180, 372, 373, 102, 104, 105, 375, 377, 380, 164, 165

[56] References Cited

U.S. PATENT DOCUMENTS

| | | | |
|---|---|---|---|
| 3,870,822 | 3/1975 | Matthews | 379/413 |
| 4,587,380 | 5/1986 | Curtin | 379/181 |
| 4,741,024 | 4/1988 | Del Monte et al. | 379/183 |
| 4,782,518 | 11/1988 | Mattley | 379/201 |
| 4,803,719 | 2/1989 | Ulrich | 379/399 |
| 5,142,569 | 8/1992 | Peters | 379/201 |

*Primary Examiner*—Wing F. Chan
*Attorney, Agent, or Firm*—Chilton, Alix & Van Kirk

[57] ABSTRACT

The telephone line has a multiple ringing patterns capacity, and the apparatus couples the telephone line to the telephone line subscriber device when a particular one of the ringing patterns is present at the telephone line. The particular ringing pattern consists of at least two ringing bursts separated by a gap which is equal to or less than a predetermined time interval. The apparatus includes logic circuitry which is set by the first burst and which, when the gap between the first burst and the second burst is equal to or less than the time interval, effects a low resistance path between an input jack and an output jack of the apparatus. The input jack is connectable to a wall socket for the telephone line, and the output jack is connectable to a socket on the telephone subscriber device. Preferably, the telephone subscriber device is a telefax machine.

3 Claims, 3 Drawing Sheets

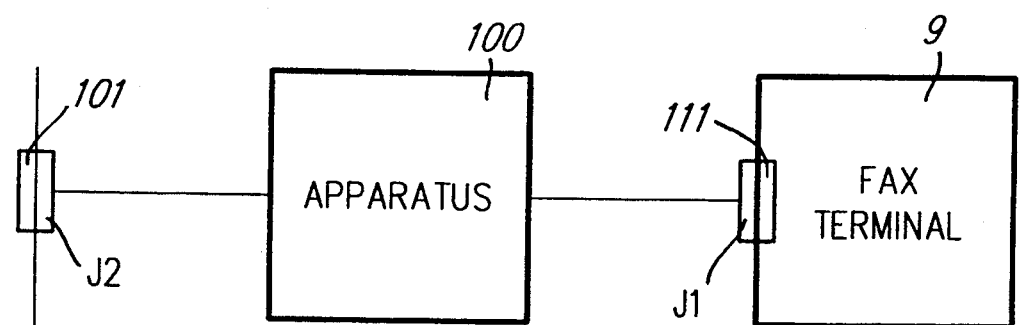
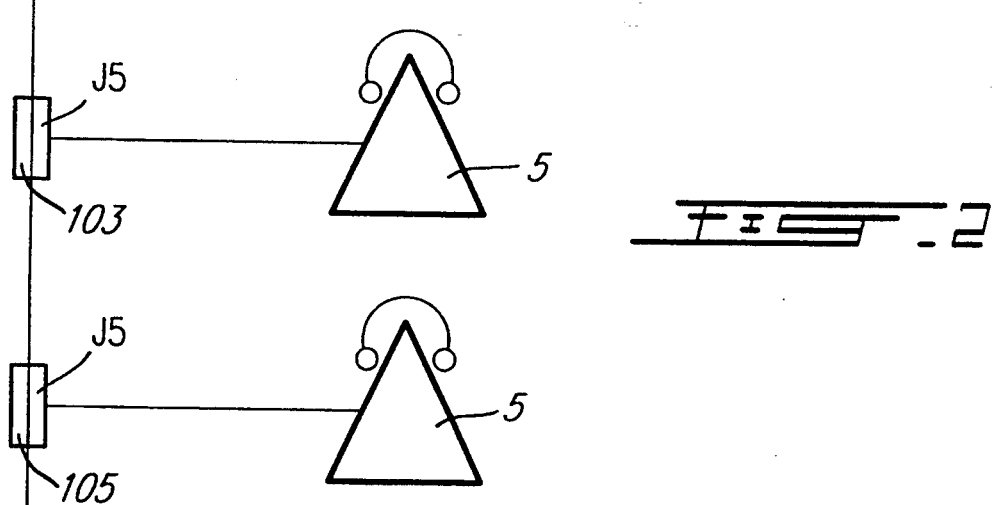
FIG. 2
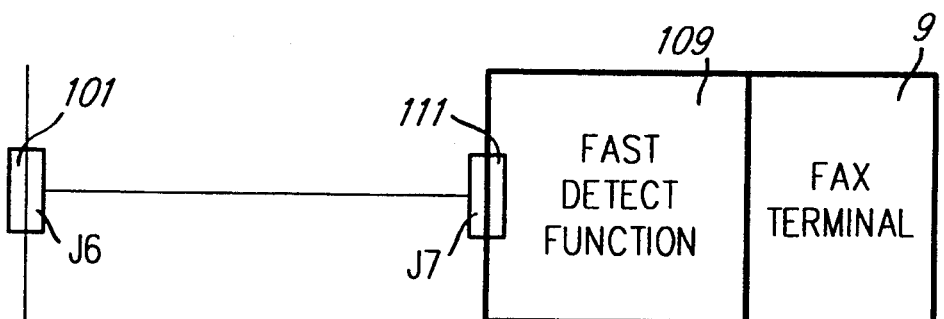
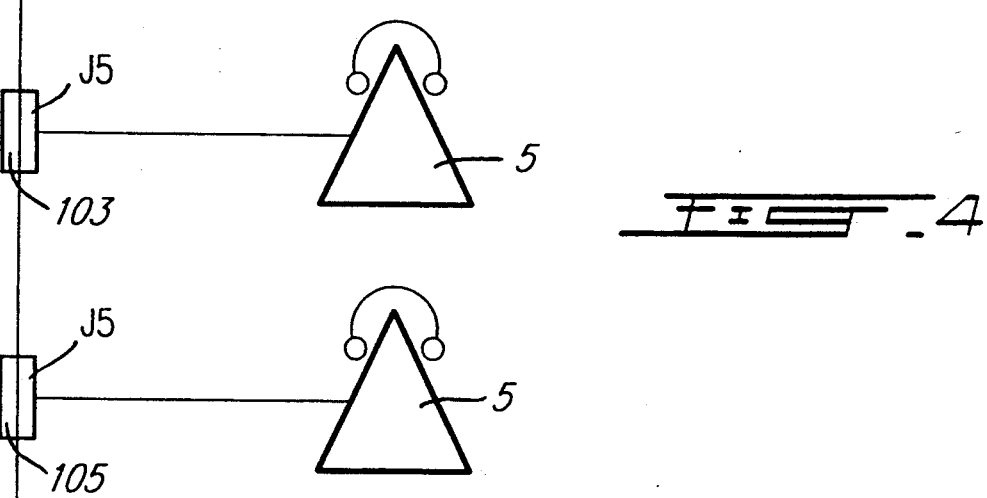
FIG. 4

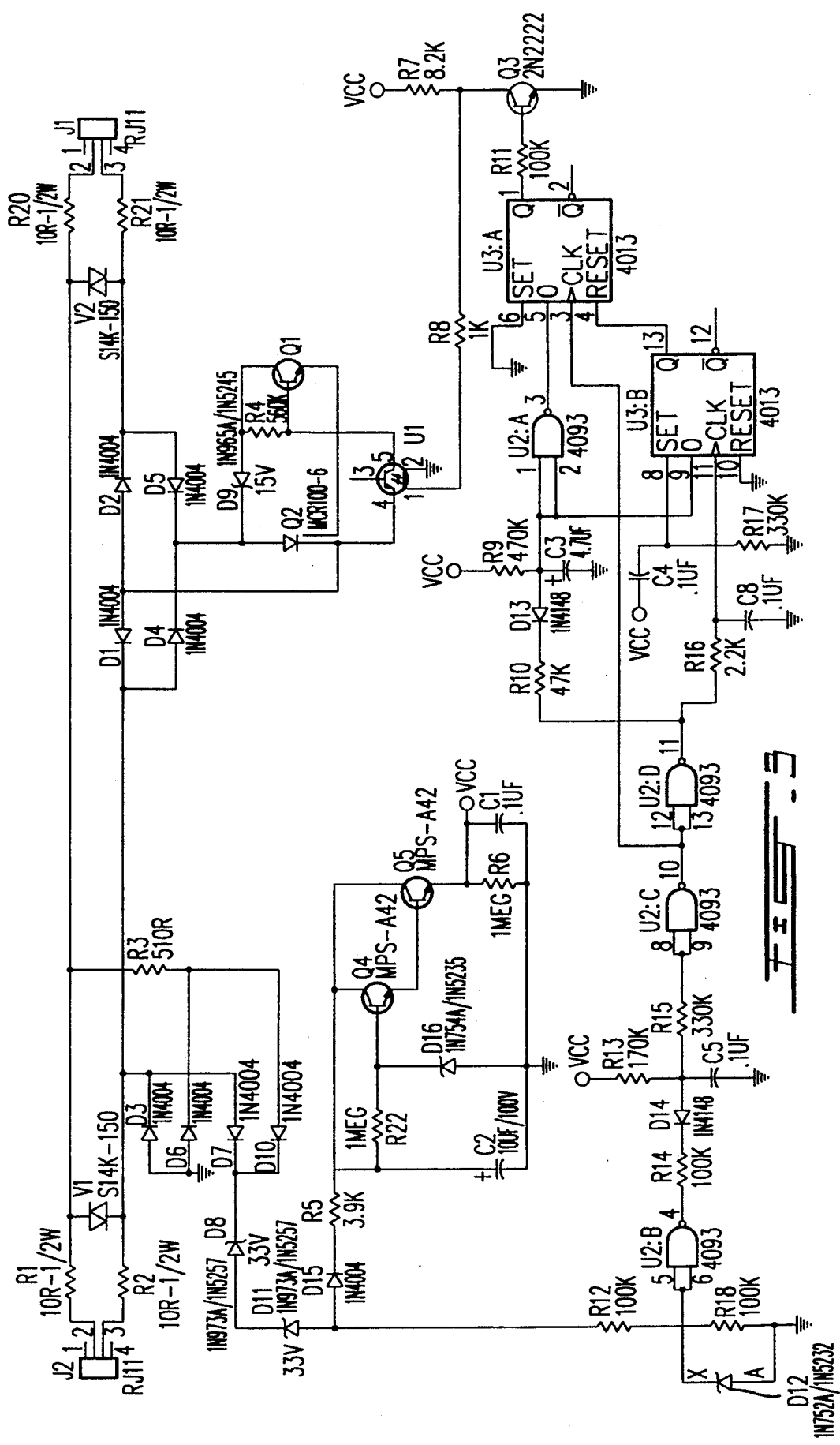

APPARATUS FOR COUPLING A TELEPHONE LINE TO A TELEPHONE LINE SUBSCRIBER DEVICE

CROSS-REFERENCE TO RELATED APPLICATION

This application is a C-I-P of Parent application Ser. No. 022,965, filed Feb. 25, 1993 now abandoned.

BACKGROUND OF INVENTION

1. Field of the Invention

The invention relates to apparatus for coupling a multiple-ringing patterns capacity telephone line to a telephone line subscriber device when a particular ringing pattern is present on the telephone line. More particularly, the invention relates to such apparatus wherein the particular ringing pattern includes at least two rings, and the second ring occurs within a predetermined time interval after the first ring.

2. Description of Prior Art

Devices exist which allege to permit facsimile terminals to share a telephone line with other uses, for example, with a telephone instrument. However, these devices do not provide a second telephone number. Typically, the prior art devices depend on the presence of a "fax tone" which is actually a "calling non-speech device" tone and is missing in a substantial number of facsimile terminals presently in use. Other devices rely on delay, and assume that a human will pick up a telephone receiver after three to five rings, and, after a delay, switch to the telefacsimile terminal.

There are, however, systems which do share a single line between at least two telephone devices such as, for example, a telephone instrument and a telefacsimile terminal. Two such systems are described in U.S. Pat. Nos. 4,578,534, Shelley, Mar. 25, 1986 and 4,825,465, Ryan, Apr. 25, 1989.

In the '534 patent, the non-dedicated telephone line 20 can be connected-either to a data set 10 or a telephone instrument 40 through contacts a, b and c of relay 61. When a computer is to access the data set 10, it sends a single ring burst. On receipt of this single ring burst, contacts a and b remain connected and the system dials the telephone number of the computer. When an external party wishes to reach the telephone instrument, the telephone number of the instrument is dialed. On the second ring burst, contact b will mate with contact c by action of the relay 61 so that the telephone instrument is connected to the telephone line 20. The system does not use two telephone numbers, including the coded telephone number, as in the inventive system.

In the '465 patent, a controller 10 consists of two parallel circuits 26 and 28 (see FIG. 2 of the Patent). Circuit 26 comprises a relay $L_1$ having coils 30 and 32 and operating contacts 38 and 40. Circuit 28 comprises a relay $L_2$ having coils 34 and 36 which operate contacts 42 and 44. Circuit 26 connects a telephone line to a device 12 (a PBX), while circuit 28 connects the same telephone line to a device 14. (a telefax machine). When one of these devices is in the off-hook condition, current will flow through the coils of its relay to thereby disconnect the other device from the telephone line so that only one device is connected to the telephone line at a time. For example, if the telephone receiver of the PBX is lifted off the hook, current will flow through coils 30 and 32 so that contacts 38 and 40 will disconnect. Thus, only the telephone device will be connected to the line 18.

In both of the patented devices, only a single telephone number is used to access either the telephone instrument or a second telephone device. Thus, the feature of automatically being connected to the telefax or the receiver as a function of the telephone number dialed is not included in, nor would it be obvious from, the teachings of the selected references.

Also known in the art are U.S. Pat. No. 4,807,278, Ross, Feb. 21, 1989, U.S. Pat. No. 4,998,273, Nichols, Mar. 5, 1991 and U.S. Pat. No. 5,142,569, Peters et al, Aug. 25, 1992.

The Nichols patent teaches an arrangement for automatically connecting a telephone line to a facsimile or other telephone connected device upon sensing a predetermined ringing pattern. However, there are substantial differences as between Nichols and the teachings of the present application as will be discussed below.

Ross simply teaches a device including two separate circuits for connecting a telephone line to two separate devices wherein each circuit senses current flowing in the other circuit indicating that the other circuit is in use and preventing the use of the circuit which senses the use of the other circuit.

Peters et al also teaches an apparatus for coupling a multiple ringing patterns capacity telephone line to a telephone line subscriber device when a particular ringing pattern is present on the telephone line. However, as stated at column 6, lines 60 et seq. of the Peters et al patent, the sensing circuitry comprises a timing logic circuitry which examines all of the pulses of the ringing pattern and compares it with patterns stored in detectors 111, 113 and 115. Thus, the entire ringing pattern has to be played out in order to determine which ringing pattern is present on the telephone line.

In addition, the multiplicity of detectors needed in Peters et al for the detection of the full ringing pattern, taken together with a reliance on a "normally energized" relay logic, precludes the use by Peters et al of telephone line power alone.

SUMMARY OF INVENTION

The invention of the present application combines two new features which, taken together, permit a non-expert user to obtain a dedicated telephone directory number for a facsimile terminal, or other telephone line subscriber device, without modifying or interrupting his local telephone wiring, or requiring access to line or battery power. Neither of these features is taught in prior art. Indeed prior art teaches solutions beyond the skills and market reach of the user community addressed by the device described. The new features are:

a) Fast special ring detection. The controlled facsimile terminal answers after only one very short ring is heard on the telephone sets. Therefore only one device is required, at the fax terminal.

b) Powering by ringing voltage alone, which is made possible by the speed of operation: the logic need not rely on energy stored for the typical 4-second interval between rings.

Feature (a) permits a software implementation with the operating program of a facsimile terminal, which is an embodiment of the principle which is also described below.

The elements described are not merely design improvements, but instead describe a novel and unobvious principle. This is to permit facsimile reception for a facsimile terminal connected to a telephone line in parallel with all other devices on that same line; that is, without disturbing local wiring or requiring removal and reconnection of these devices behind another device or devices. This can be achieved only with an intelligent device in series with the controlled terminal, as described below, or with the same function implemented in software as also described below. This is a fundamentally new configuration, which is made practical only by "fast ring detection", which is described herein. This detection principle also makes possible an implementation which works without adjustment in all North American telephone environments; this is not a property of any prior art in the cited references to distinctive ringing detection; indeed one of these refers to exactly that adjustment problem.

The highlights, as seen by the user, are:
a) Designed for "non-expert" user market
   For fax as FIRST or SECOND special ring cadence number only.
b) No user adjustments or switches.
c) Small enough to sticky-tape to fax machine.
d) In a preferred embodiment, only ONE device is required, for a complete phone/fax solution.
   because it is smart enough to work on the FIRST ring.
e) All electronic components are small enough to surface-mount, permitting manufacture at an order of magnitude lower cost.

This design can be applied for any telephone line subscriber device of which there will be only one associated with a given line and a listed telephone number with its unique ring cadence; however, it is particularly applicable to the application of providing intelligent facsimile reception, since facsimile terminals can be, and usually are, set to answer on the first ring.

The above implementation is clearly inventive, since the ability to execute the required functions without disturbing local telephone wiring is not taught by any of the cited references.

The uniqueness of the two essential differentiating and significantly innovative design features of the device, described in this application, from Ross and Nichols are clarified to highlight the unique aspects of the device for which the application is made.

It is submitted that the following two features are clearly not taught by either Ross or Nichols, and the second cannot be implemented with the Peters et al solution:

a) Connection in parallel with the existing telephone service, that is, without requiring the disconnection and series reconnection of the existing telephone wiring. For this to operate unobtrusively to the telephone user, immediate ring detection in the first ringing cycle is essential without allowing the second cycle through, about six seconds later. Only in this way is minimum disturbance to the telephone user combined with a single short burst to alert him that the facsimile terminal will be in use.

Column 2, line 48 of Nichols' disclosure stages: "the differentiation circuitry of the present invention can determine a specific called number by counting rings within a predetermined time period". This will allow two complete ring cycles, of two or three rings per cycle, and thus up to six rings to be heard by a user, of parallel-connected telephone sets, before the facsimile terminal answers and stops the ringing. This is clearly not compatible with a parallel, typically home or home office, installation, with intrinsically unobtrusive operation. A further advantage of answering in the first cycle, rather than after the end of the second or subsequent cycle, is that the call is answered six to eight seconds sooner, and thus more reliable receipt of incoming calls, particularly international calls, which are subject to time-out problems, is assured. Devices which count rings cannot do this.

It is seen that with the present invention, since the gaps between normal ("first, e.g. telephone") rings is about four seconds, and clearly the gaps between multiple rings must be less, operates as follows: "if ringing starts less than 1.2 seconds after ringing last stopped, let the ringing through to the fax terminal".

This algorithm is reliable in the presence of varying timings by different telephone companies, as is foreseen but not resolved by Nichols in his column 2, line 52: "In other implementations of this type of service by the telephone companies, it may be necessary to look at the timing of length and length between these signals".

While this algorithm is simple once stated, it was clearly not obvious to either Nichols or Peters, "who have ordinary skill in the art to which said subject matter pertains". In Nichols' column 5, line 33, he specifically states that he is "counting the number of rings in a sequence", and follows this with rather complex logic up to the end of column 6.

In summary, Nichols' disclosure does not teach a methodology for the earliest possible detection of a special ringing sequence, which is essential for parallel connection, which cannot disable the telephone ringing signal.

In addition, Nichols' figures specify the interruption and re-connection of the telephone wiring, something the user in the market addressed by the claimed device is unlikely to do.

b) No connection to a.c. power; no battery required. The only solution which can achieve this requirement, given the present state of the art of solid state devices, is a design which:

i) is completely powered by the ringing voltage which is available during, and can be stored within, the first ringing burst. Since the first burst in the first cycle may be less than one half second, it is clear that the electronic design of the device must make very efficient use of power. This requirement is made all the more demanding by (a) above, e.g. complete operation within the first ringing cycle, and in fact take the appropriate action after the first ring of the first ringing cycle, e.g. even within that first cycle. It is seen that response as soon as it is logically possible, and the challenge of obviating the need for external or battery power, are inextricably linked, and not merely improvements to prior art.

ii) This precludes the use of electromechanical relays, which are present in other prior art references, e.g., U.S. Pat. No. 4,794,637, Hashimoto, Dec. 27, 1988, U.S. Pat. No. 4,879,741, Liu, Nov. 7, 1989, and U.S. Pat. No. 5,142,569, Peters et al. Ross, in his drawing 100, shows an external power source, which is certainly in conflict with the application claimed: a user installed device which gives a fax terminal the intelligence to recognize calls intended for it, and it only, by a device which requires, and only requires, a parallel connection to the telephone line, in series with a connection to a fax terminal. This is of course implicit in the title of the present claim. Nichols shows a "switch" in his FIG. 4, but is not specific as to realization. If his switches are electromechanical relays, his device will require external power; in any case, he does not claim a solid state hardware implementation.

Neither Nichols, nor any of the other five references, addresses the issue of obtaining all required power from telephone ringing voltage, and therefore their implementations require of the user the additional complexity of installing a power connection. This Seriously disadvantages the possibility of installation by the "non-expert user", as well as adding cost.

According to Ross' Abstract, his device simply prevents one device from picking up the telephone line while another device is in use, an application which has nothing whatsoever to do with incoming call differentiation, as herein claimed. As with Nichols, Ross clearly requires the interruption and re-connection of inside telephone wiring.

Taken individually or together, the referenced prior art are not, and cannot be, solutions to the application claimed which is exactly that of giving a fax terminal its own telephone number for assured fax reception, without re-arranging fixed inside telephone wiring, which is in many places the property of the telephone service provider.

It is clear that the referenced devices all incorporate limitations which preclude them from the application specifically claimed: parallel and absolutely simple connection of a facsimile terminal, while providing it with a telephone number of its own.

However, the inventive device uniquely resolves all these limitations, and in an optimum way.

It is clear from the above that these solutions were not obvious to the inventors of the prior art.

It is therefore an object of the invention to provide an apparatus for the above-stated purpose which overcomes the disadvantages of the prior art devices.

It is a further object of the invention to provide such an apparatus which is powered by ringing voltage alone.

It is a still further object of the invention to provide a "fast special ring detection" circuitry which makes possible the powering of the apparatus by the ringing voltage alone.

In accordance with the invention there is provided an apparatus for coupling a multiple ringing patterns capacity telephone line to a telephone line subscriber device when a particular ringing pattern is present on said telephone line;

each ringing pattern of said multiple ringing patterns being associated with a different respective telephone subscriber number;

said device being associated with a particular one of said telephone subscriber numbers which is associated with said particular ringing pattern;

said particular ringing pattern comprising a first ringing burst and a second ringing burst separated by a time gap being equal to or less than a predetermined time interval;

said apparatus comprising an input jack, connectable to a wall socket for said telephone line, and an output jack, connectable to an input socket of said telephone line subscriber device;

said apparatus including logic means connected to said input jack;

said logic means being set when said first ringing burst is present at said input jack;

wherein, when said second burst is present at said input jack in the interval of said time gap, said logic means effects the provision of a low resistance path between said input jack and said output jack whereby said second ringing burst is received by said telephone line subscriber device.

BRIEF DESCRIPTION OF DRAWINGS

The invention will be better understood by an examination of the following description, together with the accompanying drawings, in which:

FIG. 2 illustrates, in block diagram form, an apparatus for coupling a telephone line to a telefax terminal on receipt of a predetermined ringing pattern;

FIG. 3 is a circuit diagram of the apparatus of FIG. 2; and

FIG. 4 illustrates a software implementation.

DESCRIPTION OF PREFERRED EMBODIMENTS

Figure 1:
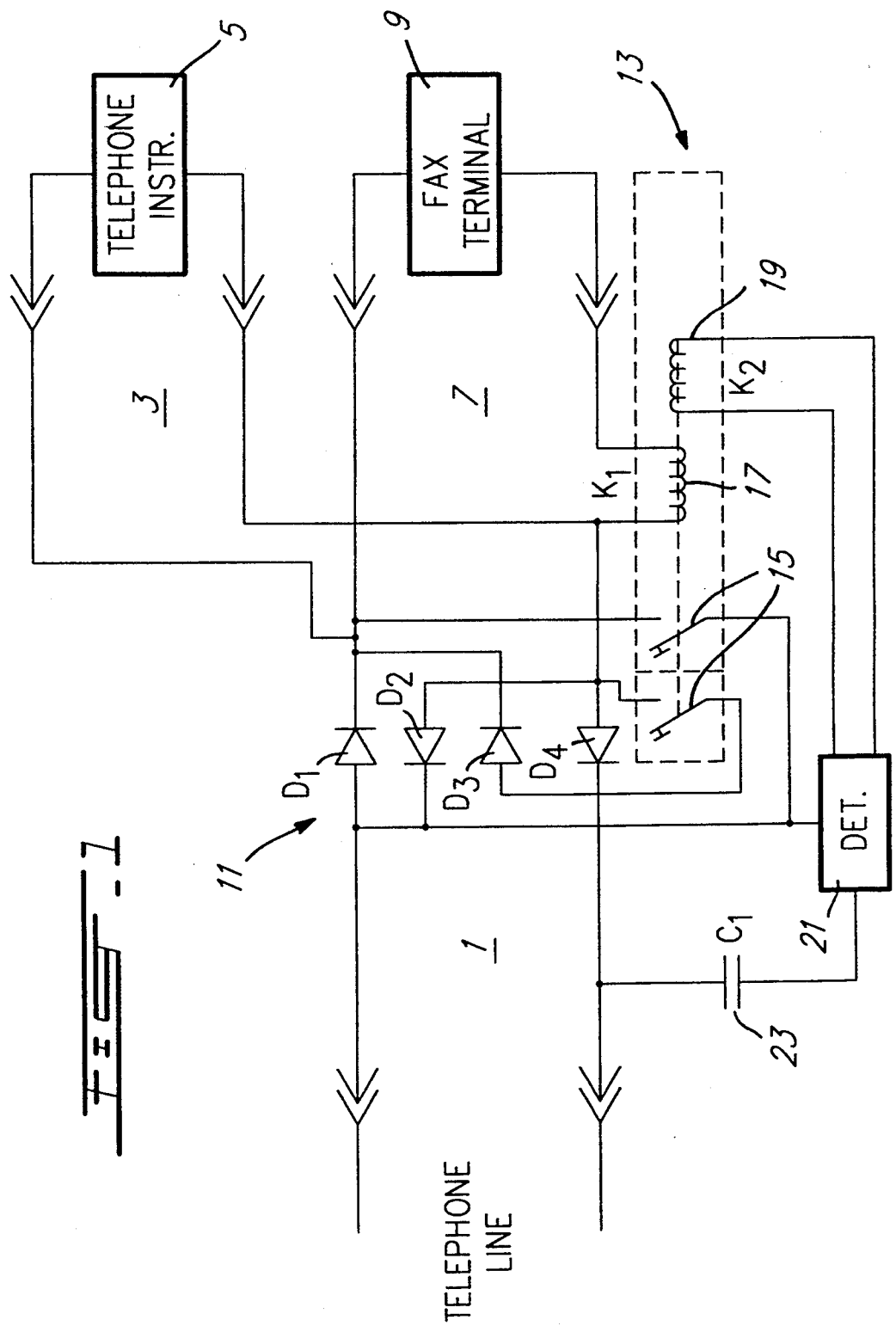
FIG. 1 illustrates an apparatus in accordance with the invention which switches between a telephone instrument and a telefax terminal.

Referring to FIG. 1, an input telephone line 1 is connectable either, via telephone instrument line 3 to a telephone instrument 5, or, via telefacsimile terminal line 7 to a telefacsimile terminal 9. A rectifier bridge 11, comprising diodes D1, D2, D3 and D4, is connected across the line 3 and presents a rectified signal to the telephone instrument on receipt of an uncoded telephone number.

Relay 13 comprises movable switches 15 and coils 17 and 19. When current runs through either coil 17 or coil 19, the switches 15 will move to their closed position.

Detector 21 detects a coded telephone number and, on detection of the coded telephone number, causes current to flow through the coil 19.

In operation, the telephone circuit of line 3 used for normal telephone operation is not interrupted. The device is attached to the circuit in parallel and the facsimile terminal is attached to the device. The device requires no external power other than that provided by the telephone line, and it does not require a battery.

In the idle condition, there is no alternating voltage on the line, and therefore the ringing detector circuit 21 is isolated by capacitor 23 and is not activated. The rectifier bridge extends the normal supervisory voltage to the facsimile terminal so that the placing of a call from the facsimile terminal can be detected.

When a standard telephone ringing signal is detected, the device rectifies the alternating current ringing signal of the telephone number to the facsimile terminal so that only direct current reaches it, and therefore the ringing detector of the fax terminal is not activated, but the called telephone instrument rings in its normal manner.

If a call is placed from the telefacsimile terminal, to send out a telefacsimile signal, current flows in coil 17 so that contacts 15 short out the rectifier bridge 11. Accordingly, the telephone line 1 is connected directly to line 7 of the telefacsimile terminal 9 except for the small resistance of the coil K1. When the telefacsimile terminal completes its transmission, coil 17 releases some 75 milliseconds later and the device returns to its idle condition.

The ringing detector 21 is set to detect the presence of 40 to 130 volts alternating current at approximately 20 Hz. If, and only if, ringing is present for, for example, more than 0.75 seconds but less than 1.5 seconds, ringing detector 21 sends a current through coil 2 so that once again switch elements 15 of the relay 13 are closed. In the above example, with a normal telephone ring of 2 seconds duration and 4 seconds pause between rings, the ringing detector 21 does not operate, i.e., it does not provide a current to the coil 19.

However, with a coded telephone number, the first burst of a "coded" ring is 1 second, for example, followed by one-half second of silence, followed by a second burst of 1 second. Therefore, during the silent period, current is provided to coil 19 so that the second burst is applied to the facsimile terminal causing it to answer. The connection will then be held by the direct line current flowing in coil 19 until the call is cleared. This is also the principle of operation of the circuit of FIG. 3.

With this apparatus, there is provided a separate telephone number for both the telephone instrument and the telefacsimile terminal but utilizing only a single telephone line. Accordingly, the cost of an extra telephone line is avoided.

When the telephone instrument is in operation, the telefacsimile terminal is decoupled from the telephone line. In the same way, when the telefacsimile terminal is in operation, the telephone instrument is decoupled from the telephone line. Accordingly, the decoupled element is isolated from the telephone line when it is decoupled.

The inventive system is not similar to "party line" ringing, which is no longer practical now that most equipment on premises is provided by the customer himself. With the novel device, it can be seen that calls to the telephone instrument are automatically separated from calls to the telefacsimile terminal, and calls to the telefacsimile terminal are automatically separated from calls to the telephone instrument. This is, of course, because two separate telephone numbers are used.

In addition, it is possible to use both a telephone instrument and a telefacsimile terminal on the same telephone line without one degrading the performance of the other.

In the above embodiment, Applicant has described a time duration code with specific time durations. Obviously, different time durations could be used in a time duration code.

Further, the illustrated embodiment shows two separate coils on a single relay. Obviously, two relays could be used wherein each coil would have a separate set of switches.

Although an arrangement for switching between a telephone line and a fax terminal is acceptable, it is also desirable to include an apparatus which is interposed between a telephone line and a telefax terminal. This apparatus would operate to "pass" only a predetermined ringing pattern. In effect, it would act as a "filter" to block any other ringing patterns.

Such an arrangement is illustrated, in block form, in FIG. 2. As can be seen, apparatus 100 is interposed between a telephone line socket 101 and a telefax terminal 9. Jack J1 connects the apparatus 100 to the fax terminal and jack J2 connects the apparatus to the telephone line wall socket 101. As also seen, telephone instruments 5 are connected to other wall sockets 103, 105 by jacks J5.

The circuitry of the apparatus 100 is illustrated in FIG. 3. As can be seen, the apparatus includes the jack J2 at the left-hand end and J1 at the right-hand end.

Concerning the theory of operation of the circuit, the circuit is entirely powered, for up to 6 seconds at a time, by energy stored from bursts of ringing voltage on the telephone line. Installation is simplified by the fact that while multiple telephone sets on a line are the norm, there is never more than one fax machine on any telephone line. Therefore, if one short (typically half to one second), and distinctly different telephone ring for a fax call is acceptable, telephone wiring can be left unmodified. The facsimile terminal with the intelligent receiving properties defined herein will pick up on the second, short ring in the first ringing cycle, that is, within a second or two. All that is needed is to plug the circuit between the facsimile terminal and the wall socket as per FIG. 2. Operation is as follows:

i) While neither telephone nor fax are in use, the line voltage is about 52 volts d.c., and the circuit draws no current at all.

ii) When a telephone call is made, the voltage is less than 52 volts, and the circuit does nothing at all.

iii) When a call is made from the facsimile terminal, the circuit connects the fax to the line, the caller hears dial tone, and the call proceeds as if the fax machine has its own line, which indeed it has.

iv) When a telephone call comes in, the ringing signal is not passed through to the fax machine. Therefore, only the telephones on the line ring, and they will be answered as they were before. Whatever the setting of the fax, it will not intercept telephone calls.

v) When a fax call comes in, its special ringing pattern is detected, and the ringing power is used to activate the unit, which passes on the ringing signal to the fax machine, which answers immediately. The caller hears the fax answer with a fax answer tone, on the first ring, without any voice message.

The circuit also includes logic elements, comprising logic gates U2 (U2A, U2B, U2C and U2D) and flip-flops U3 (U3A, U3B). The circuit also includes a first timer circuit (R14-D14-R13-C5-R15) and a second timer circuit (R10-D13-R19-D3) and a third timer circuit (C4-R17).

When the fax machine is taken off-hook at J1, there is no drive to the optically coupled switch U1, and the path D9-R4-Q1 turns thyristor switch Q2 on, which, through the diode bridge D1-D2-D3-D4 provides a low-resistance path to the telephone line. The fax caller hears dial tone from the telephone line at J2, and makes his call.

When ringing voltage arrives at J2, the unit is powered up immediately, U3A is RESET, therefore transistor switch Q3 is off, and thus the optically coupled switch U1 is on, keeping transistor switch Q1 off, thus thyristor switch Q2 off. Ringing voltage is not passed to the fax machine at J1.

The diode bridge D3-D6-D7-D10 rectifies ringing voltage; resistor R3 limits the peak current drawn. The frequency out of the bridge is full wave rectified 20 Hertz, thus nominally 40 Hertz, except that the presence of 50 volts d.c. telephone battery causes the peak of one half cycle to be 100 volts greater than that of the other.

When no ringing voltage is present, the Zener diodes D8 and D11, with a total drop of 66 volts, ensure that the device draws no current from the telephone line; there is no voltage at Vcc.

When ringing voltage is superimposed on the telephone battery, up to 105 volts a.c. rms plus 50 volts d.c., less the drop of 66 volts in D8 and D11, thus 133 volts, or less depending on the telephone circuit drop, is provided to the anode of D15, and to the resistive divider R12 and R18. The path D15-R5 charges capacitor C2 to approximately 50 volts. The series Darlington voltage regulator circuit R22-D16-Q4-Q5-R6-C1 provides a stable +6 volts d.c. relative to logic ground of the device, which is not the same as earth ground. Vcc and logic ground are extended to power U2 and U3, and to various points in the device as shown in FIG. 1.

Rectified ringing voltage also appears at the junction of R18 and R12, and is limited to about 5.6 volts relative to logic ground by Zener diode D12. That is, while ringing is present, input to NAND gate U2B (pins 5 and 6) will be logic high for part of each 25 millisecond half-cycle of the 20 Hertz ringing frequency.

Therefore, while ringing is present, NAND gate U2B output (pin 4) will be logic low for part of each 25 millisecond half-cycle of the 20 Hertz ringing frequency.

The filter circuit at the output of U2B, R14-D14-R13-C5-R15, provides a signal which is logic low throughout the entirety of each ringing voltage burst, e.g. throughout each audible ring. The transitions of the resulting signal at the U2C input (pins 8 and 9) are made square by U2C, since this circuit also has a Schmitt Trigger function, appearing inverted at the output of U2C (pin 10), connected to U2D input (pins 12 and 13) and inverted once again to appear at U2D output (pin 11).

These clean signals, e.g. logic high during ringing at U2C output (pin 10) and logic low during ringing at U2D output (pin 11) are used to drive the balance of the low level logic.

When the device is initially powered up, at the beginning of the first ringing cycle in an answer sequence, capacitor C4 drives the SET input (pin 8) of D flip-flop U3B to logic high, then a few milliseconds later, R17 pulls this input to logic low.

Therefore the initial condition of the dual D flip-flop U3 is U3B SET, and since the Q output of U3B is logic high, the connection to the RESET input of U3A goes high, and therefore U3A will be initially RESET.

A second delay circuit R10-D13-R9-C3 produces a signal at U2A input (pins 1 and 2) which goes low early in the first ring, and stays low during the gaps, of 450 to 650 milliseconds, between rings of multiple-ring sequences for the second or third directory numbers. That is, it does not go high during ringing gaps of less than about 1.2 seconds, but does go high during the pauses between single rings associated with the first directory number. The output of U2A (pin 3) is the complement of this signal, e.g. it stays high during the short gaps of the multiple ring sequences for the second or third directory numbers, but goes low after the ringing has stopped for about 1.2 seconds, and therefore certainly during the pause of about 4 seconds between rings for the first number, which is associated with the telephone.

As above, U3B is initially set, and U3A is RESET. U3B (pin 11) is then clocked at the end of the first ring, from the rising edge at U2D pin 11. Since C3 is nearly discharged at that time, U3B D input (pin 9) is low, and flip-flop U3B is reset. U3B remains reset for the remainder of the unit's operation on this power-up sequence.

Therefore, remaining operation of U3A is a function of the state of its D input (pin 5) when the Clock input (pin 3) rises.

When the second ringing burst begins, U3A is clocked (on its pin 3) from the rising edge at U2 pins 10-12-13. Data on U3A pin 5 is loaded from U2A pin 3, the squared-up complement of the condition at C3 positive.

If the ringing has been stopped for more than 1.2 seconds, C3 is charged over logic threshold and U2A input (pins 1,2) is high, U2A output (pin 3) is low, therefore U3A D input (pin 5) is low, and U3A is not set.

However, if ringing has been stopped for less than 1.2 seconds, U2A output (pin 3) will be high when U3A is clocked, so U3A Q output (pin 1) will go high, turning on transistor Q3. Q3 being on, the path from Vcc to the LED of optically coupled switch U1 is broken, U1 is turned off, and transistor switch Q1 will turn on the thyristor switch Q2, which will let ringing voltage through to the fax machine connected at J1.

The gap between rings in the multiple ring pattern is, throughout North America, 0.45 to 0.65 seconds. The gap between rings for the first number, single ring, is 3.5 to 4.5 seconds. Therefore, the implementation shown has a very wide tolerance, and is suitable for implementation with an RC (Resistor-Capacitor) approach. In this way, the adjustable, precision timing logic shown in prior art is not required.

This logical solution is optimally fast for the application claimed: provision of a dedicated telephone directory number for a facsimile terminal by parallel connection to existing, undisturbed wiring, in series only with the telefacsimile terminal.

a) If two or more rings are heard in the first ringing pattern, it passes the second and subsequent rings through to the connected telefacsimile terminal. If the telefacsimile terminal is set, as it should be, to answer after the first ring, no more ring sequences will be heard by parallel connected telephones. In a multi-ring sequence, each ring burst is short, as it must be, since the total time is limited to about 3 seconds. Typically, the first ring that is overheard will be a second or less in length. This is easily distinguished by the human user from the normal 2-second ring, and is minimally annoying, since it does not recur.

b) The telephone operates exactly as it did before, for any number of rings; the facsimile terminal never answers calls to the telephone number, since ringing voltage is never passed through to J1.

That is, the implementation shown is optimal for fax machines, since they normally answer automatically, on the first ring.

The process described can be implemented with very broad tolerances, of the order of −50%/+100%. That is, unlike prior teachings which use digital timing, simple 5% RC timing and CMOS logic can be used. This is essential to the complete powering by ringing voltage. Prior art does not teach this principle which is fundamental to the application described, e.g. simple installation by a non-expert user, connected only in series with only one device, being the device controlled.

A software implementation is illustrated in FIG. 4. As can be seen in FIG. 4, the software algorithm emulating the operation of the hardware is included at 109 in the fax terminal 9.

The principle of operation of the software implementation of the inventive apparatus is identical to the hardware implementation, with the exception that the device managed for facsimile reception can in many cases respond even faster.

The software implementation will most often be done in the operating programs of facsimile terminals for intelligent reception; however, the principles herein embodied could be implemented in firmware or software of any facsimile receiving device, such as for a PC-fax card, or "fax box" as may be used for incoming storage for the purpose of printing.

An important attribute of the "fast answer" algorithm in this context is that it is possible to save even the time required to recognize the second short ring in the first ringing cycle, whereas the hardware implementation described above provides optimum recognition of identified special ring cadence but relies on the connected device to answer shortly thereafter. That is, if the interval after the first ring burst is less than 1.2 seconds, when ringing voltage is seen, answer immediately. Almost all electromechanical ringers, and most telephones, will not ring at all if only one cycle of ringing, at about 20 Hz, is seen. Therefore, the perceived operation of intelligent reception will be within about one second. Operation with a facsimile or other terminal which answers after one ring, appended to the device described above, would take about two seconds.

This is potentially a further improvement relative to prior art, which count rings in the first sequence, and takes the appropriate action in the second sequence, for a total of about 8 seconds.

The design and circuit described above provides, in U2 and U3B, all the basic signal interpretation and resolution logic necessary to resolve and discriminate more complex ringing cadences. All that is required is to extend the logic of U3A, which is basically a counter of length 1 to length 2 or more.

That is, if ringing starts less than 1.2 seconds after ringing stops, increment counter. If two rings have been counted within 3 seconds, let third ring through to connected device. After 3 seconds, reset and start over.

This process is differentiated from prior art devices in that the requisite action is taken in the first ringing sequence, in about 2 seconds rather than 8 seconds.

Although particular embodiments have been described, this was for the purpose of illustrating, but not limiting, the invention. Various modifications, which will come readily to the mind of one skilled in the art, are within the scope of the invention as defined in the appended claims.

I claim:

1. An apparatus for connecting a multiple ringing capacity telephone line to a subscriber telephone line device set to answer after a single ringing burst and associated with a special directory number different from a primary directory number, the apparatus comprising:

an input jack connectable to a wall socket for said multiple ringing capacity telephone line;

an output means connectable to said subscriber telephone line device;

a normally open switch connecting said input jack to said output means, said switch being closed when a closing signal is supplied said input jack being disconnected from said output when said switch is open;

means connected to said output means and said switch for providing said closing signal to said switch when said subscriber telephone line device goes off-hook;

a timing capacitor;

means for discharging said timing capacitor continuously;

diode means connected to said input jack for converting and supplying DC power only from an AC ringing current at said input jack;

means connected to said diode means for charging said timing capacitor to a maximum charge value; and means connected to said diode means, said switch and said timing capacitor for supplying said closing signal when said timing capacitor has a level of charge above a predetermined threshold when said DC power begins to be supplied, whereby a second ring, arriving within a predetermined time interval after a first ring at said input jack, will be passed through to said output means.

2. The apparatus as claimed in claim 1, wherein said switch comprises a thyristor means for switching both DC and AC current.

3. The apparatus as claimed in claim 2, wherein said closing signal fed to said thyristor means from said supplying means is optically coupled.

* * * * *